(12) United States Patent
Dohm (10) Patent No.: US 7,916,743 B2
(45) Date of Patent: Mar. 29, 2011

(54) SYSTEM AND METHOD FOR IMPROVED MULTICAST PERFORMANCE

(75) Inventor: Nathan Dohm, Natick, MA (US)

(73) Assignee: Jinsalas Solutions, LLC, Dover, DE (US)

(*) Notice: Subject to any disclaimer, the term of this patent is extended or adjusted under 35 U.S.C. 154(b) by 1182 days.

(21) Appl. No.: 10/990,585

(22) Filed: Nov. 17, 2004

(65) Prior Publication Data

US 2006/0104275 A1    May 18, 2006

(51) Int. Cl.
*H04L 12/28* (2006.01)
*H04L 12/56* (2006.01)

(52) U.S. Cl. ......... 370/414; 370/312; 370/390; 370/432

(58) Field of Classification Search .......... 370/235, 370/401, 412–419, 389–392, 428–429; 709/212–219; 710/52–57
See application file for complete search history.

(56) References Cited

U.S. PATENT DOCUMENTS

| | | | | |
|---|---|---|---|---|
| 5,687,324 A * | 11/1997 | Green et al. | ............. | 370/414 |
| 5,689,500 A * | 11/1997 | Chiussi et al. | ............. | 370/235 |
| 6,272,134 B1 * | 8/2001 | Bass et al. | ............. | 370/390 |
| 6,667,985 B1 * | 12/2003 | Drummond-Murray | ..... | 370/415 |
| 6,731,644 B1 * | 5/2004 | Epps et al. | ............. | 370/412 |
| 6,975,637 B1 * | 12/2005 | Lenell | ............. | 370/412 |
| 6,996,102 B2 * | 2/2006 | Pegrum et al. | ............. | 370/390 |
| 7,151,777 B2 * | 12/2006 | Sawey | ............. | 370/413 |
| 7,260,104 B2 * | 8/2007 | Schmidt | ............. | 370/414 |
| 7,397,809 B2 * | 7/2008 | Wang | ............. | 370/417 |
| 2002/0039366 A1 * | 4/2002 | Sano | ............. | 370/390 |
| 2002/0114338 A1 * | 8/2002 | Craig et al. | ............. | 370/401 |
| 2004/0015561 A1 | 1/2004 | Mayhew et al. | | |
| 2004/0114616 A1 * | 6/2004 | Wang | ............. | 370/412 |
| 2004/0128410 A1 | 7/2004 | Mayhew et al. | | |
| 2005/0080976 A1 | 4/2005 | Brocco et al. | | |
| 2005/0195845 A1 | 9/2005 | Mayhew et al. | | |
| 2005/0270974 A1 | 12/2005 | Mayhew | | |
| 2006/0050691 A1 | 3/2006 | Meier | | |
| 2007/0071005 A1 | 3/2007 | Mayhew et al. | | |
| 2008/0250116 A1 * | 10/2008 | Brown | ............. | 709/213 |

* cited by examiner

*Primary Examiner* — Aung S Moe
*Assistant Examiner* — Habte Mered (57) ABSTRACT

The present invention provides an improved architecture and method for the processing and transmission of multicast packets within a switching device. Briefly, as multicast packets arrive, a copy of the packet, or preferably a pointer for it, is placed in a multicast FIFO. As each pointer reaches the head of the FIFO, the destination output ports via which the packet is to be transmitted are determined, based on the packet's multicast group identifier (MGID). In the preferred embodiment, there is a dedicated multicast output queue associated with each output port. Copies of the packet, or preferably pointers to the packet, are then stored in those output queues associated with the specified destination output ports. In this way, a congested output port only affects the transmission of multicast packets via that congested port.

16 Claims, 6 Drawing Sheets

| | |
|---|---|
| P0 - intended for output ports 0 and 1 | Head of queue |
| P1 – intended for output ports 2 and 3 | |
| P2 – intended for output ports 2 and 3 | |
| P3 – intended for output ports 2 and 3 | |
| P4 – intended for output ports 2 and 3 | |

PRIOR ART - Single Multicast Queue Structure

Figure 1

PRIOR ART: Separate queue structure based on multicast group ID

SYSTEM AND METHOD FOR IMPROVED MULTICAST PERFORMANCE

BACKGROUND OF THE INVENTION

Computer networks are designed to allow various devices to communicate together. These devices include computers, servers, wireless devices, such as personal digital assistants (PDAs) and intermediate devices, such as switches and routers. These intermediate devices are used for a number of purposes. Switches may be included in a network if the distance between the two devices is greater than that allowed by the relevant network specification. Switches are also used to expand the size of the network, by allowing many additional paths of communications. Similarly, switches are used to create redundancy within the network. For example, switches may be included in a network to insure that there are at least two paths between each set of devices. In this way, the system is able to operate in the event of a failure or malfunction that affects one path, by routing traffic through the alternate path.

There are a number of different methods that these devices can use to communicate. The most common form of communication is that from a single source to a single destination, also known as unicast traffic. Typically, the source transmits a packet of information, with some means of identifying the destination. In more complex networks, that message may be received by an intermediate device, such as a switch, which lies in the path between the source and the destination. After receipt, this switch then retransmits the message along the path toward the destination. While the packet may pass through a number of intermediate destinations, there is only one true destination, which is the device that the packet is ultimately intended for.

A second type of communication is known as multicast communication. Multicast communication allows a single source to communicate with a number of different destination devices by sending a single packet. There are various instances where multicast communication can be employed. For example, a server may be transmitting a multimedia presentation, such as a video training program, which is destined for a number of remote users. Rather than transmitting the video stream separately to each remote user, the network can employ a multicast communication. In this way, the server transmits a single video stream, with multiple destination addresses so that the presentation reaches all of the intended recipients. Other applications could include desktop video conferencing, corporation broadcasts, and television broadcasts. This approach can be very effective in reducing network traffic, in environments, such as those listed above, where one device is sending the same information to multiple devices. Additionally, multicast traffic is also used in network configuration, such as to inform all switching elements within the network to update their routing tables.

Many networks include devices known as switches, which accept packets from a number of ports and forward those packets toward their final destination. In the case of unicast packets, the switch receives the packet via one of its input ports, determines the required output port and places the packet on the corresponding output queue. If the requested output port is blocked or congested, then the packet is held in the queue until it can be transmitted. Once the packet has been transmitted, it can be discarded by the switch.

As previously stated, multicast traffic can reduce the volume of network traffic in certain environments. However, the nature of multicast packets necessitates a more complex architecture in the switch. Unlike unicast packets, which are destined for a single output port, a multicast packet is typically destined for several output ports. Each of these output ports may have different operating characteristics, such as different queue depths, and different amount of congestion. Therefore, a multicast packet that is destined for two different output ports may be transmitted immediately via one output port, but still be pending transmission via a second output port. Because of this difference in the behavior of multicast packets, they require a specialized architecture.

Figure 1:
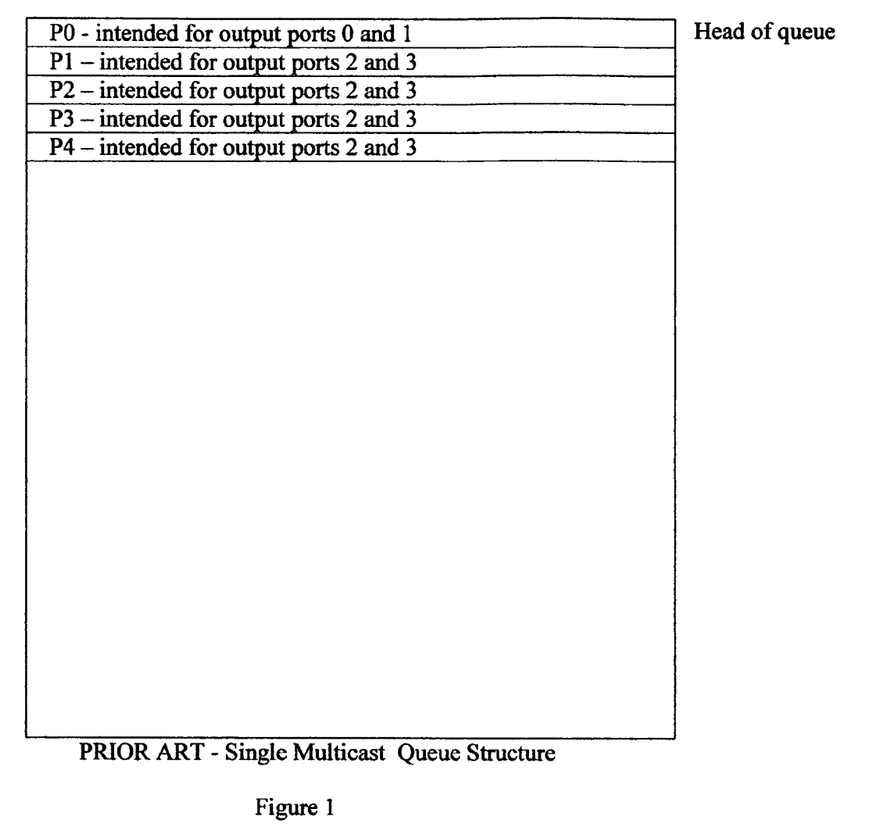
FIG. 1 illustrates a first embodiment of an architecture typically used to process multicast packets in the prior art.

The simplest way of handling multicast packets is to store all multicast packets in a separate multicast queue as they arrive as shown in FIG. 1. When a packet reaches the head of the queue, the switch determines the various destination output ports. The packet then remains at the head of the queue until it has been successfully transmitted via all selected output ports. This method has a serious limitation in that congestion at one output port causes all other multicast packets in the queue to be blocked. For example, assume that the multicast packet at the head of the queue is intended for ports 0 and 1, and that the next several packets are intended for ports 2 and 3. Congestion at output port 0 will force the first packet to remain at the head of the queue until the congestion is resolved. Note that the other packets in the queue, which were not intended for the congested port 0, are forced to wait until output port 0 can send the first multicast packet. This condition, referred to as head of line blocking, can seriously impact network performance.

Alternatively, this scheme can be implemented such that the queue stores only a pointer to the actual multicast packet. This embodiment reduces the amount of storage required and also reduces the number of times and locations to which the multicast packet must be written within the device. In essence, each entry in the queue is an address, where that address corresponds to the actual location of the multicast packet within the chip.

Typically, rather than identify each output port in a multicast packet, multicast packets contain a data field that identifies this set of ports. This field is commonly known as a multicast group identifier (MGID). Therefore, in the example above, the first packet may be intended for MGID 0, which identifies ports 0 and 1 as the intended output ports. Similarly, the remaining packets may be intended for a different multicast group.

Figure 2:
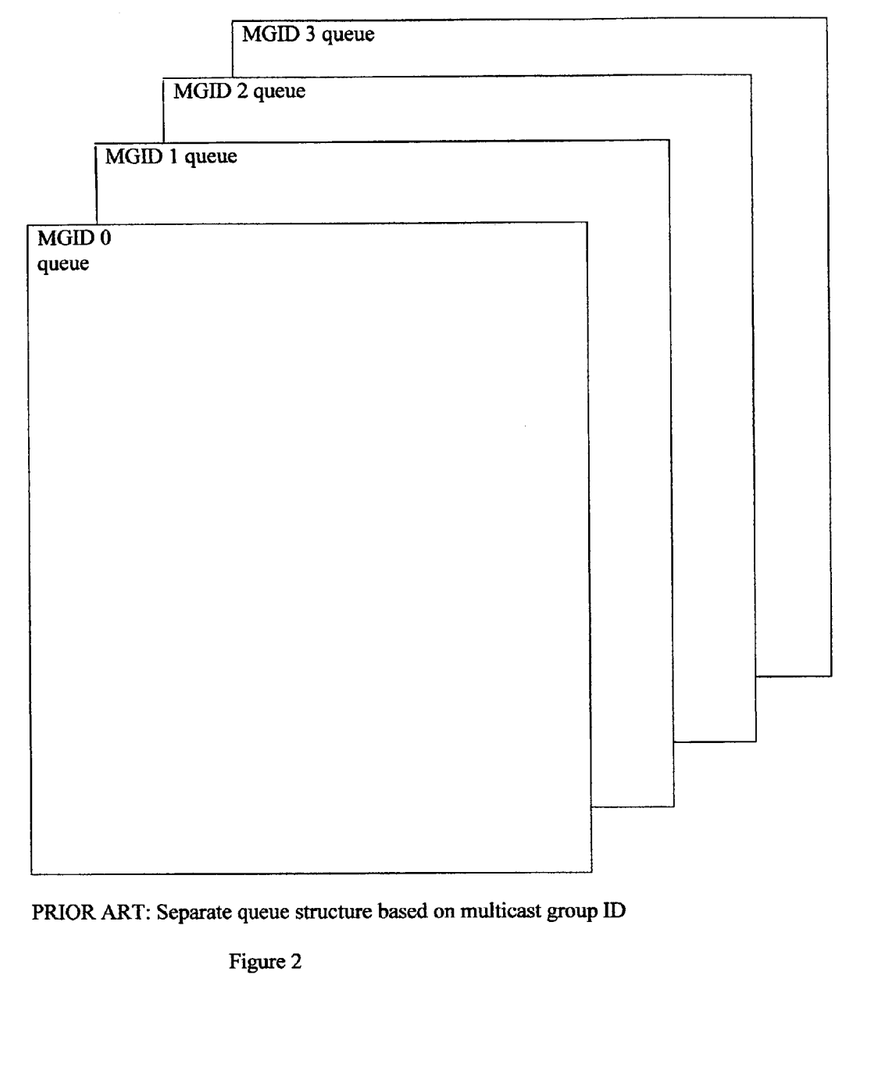
FIG. 2 illustrates a second embodiment of an architecture typically used to process multicast packets in the prior art.

Therefore, it is possible to relieve the head of line blocking issue if, instead of a single queue associated with multicast packets, a set of queues is created as shown in FIG. 2. Each queue in this set of queues is associated with a single multicast group identifier. As with FIG. 1, these queues can be used to hold the actual packets or simply pointers to the packets.

While this embodiment resolves the head of line blocking issue raised with respect to the single multicast queue, it has some serious drawbacks. First, there can be a large number of potential multicast groups. This requires an equal number of queues, since there is a corresponding queue for each MGID. During initialization, the switch will typically communicate to each of its neighboring switches a number of multicast credits, which is the number of multicast packets which it is guaranteed to be able to store.

If there are N input ports, and the switch has communicated that it has M multicast credits, then the number of multicast packets that the switch must be able to store is given as N×M. However, since these credits are granted independent of the individual multicast group, it is not possible to predict the distribution of multicast groups that are received. In other words, it is possible that all of the incoming packets may belong to a single multicast group. Thus, in order to guarantee that the switch is able to store and process all of the incoming multicast packets, each queue must be able to store N×M multicast packets (or pointers). Depending on the number of multicast groups that are supported, this may require a prohibitively large amount of storage to be allocated to this function.

In addition to the amount of storage required, this implementation leads to large deviations in latency. For example, suppose that MGID0 denotes multicast packets destined for output ports 0 and 1, while MGID1 denotes multicast packets destined for output ports 1 and 2. Further assume that multicast packets arrive in the following sequence:
P1(MGID0),P2(MGID0),P3(MGID1),P4(MGID1),P5 (MGID0),P6(MGID1)

If output port 0 is congested, then packets P1, P2 and P5 will remain in their respective queue. During this time, packets P3, P4 and P6 are all transmitted to output ports 1 and 2, even though they all arrived after P1 and P2. This creates a large deviation in the amount of latency that each multicast packet experiences.

Furthermore, packets P2 and P5 could have been transmitted via output port 1, even while output port 0 was congested. These multicast packets could then be transmitted via output port 0 at a later time when the congestion on that port was alleviated. Thus, packets within a single MGID queue will still experience head of line blocking with respect to the non-congested output ports associated with that multicast group.

As described earlier, the aforementioned embodiment is improved by using queues of pointers rather than queues of packets. In this embodiment, all multicast packets are stored in a common storage element. For example, if a multicast packet for MGID 0 arrived, it would be placed in the common storage area. Its address in that common storage area would then be stored in the queue associated with that MGID. This embodiment requires less storage than the previous embodiment, since the storage area only needs to accommodate N×M packets, rather than N×M×(the number of groups). However, some networks allow for hundreds of multicast groups. Even though this embodiment only requires a queue of pointers per MGID, the storage requirements to support large numbers of multicast groups can still be prohibitive, since each queue must be capable of storing N×M entries. In addition, the drawbacks associated with latency and head of line blocking described with respect to FIG. 2 are still present in this embodiment.

An architecture and method for efficiently processing and transmitting multicast packets with minimal storage requirements and improved performance is needed.

SUMMARY OF THE INVENTION

The problems with the prior art have been overcome with the present invention, which provides an improved architecture and method for the processing and transmission of multicast packets within a switching device. Briefly, as multicast packets arrive, a copy of the packet, or preferably a pointer to the packet, is placed in a multicast FIFO. As each pointer reaches the head of the FIFO, the destination output ports via which the packet is to be transmitted are determined, based on the packet's multicast group identifier (MGID). In the preferred embodiment, there is a dedicated multicast output queue associated with each output port. Copies of the packet, or preferably pointers to the packet, are then stored in those output queues associated with the destination output ports. In this way, a congested output port only affects the transmission of multicast packets via that congested port.

DETAILED DESCRIPTION OF THE INVENTION

Figure 3:
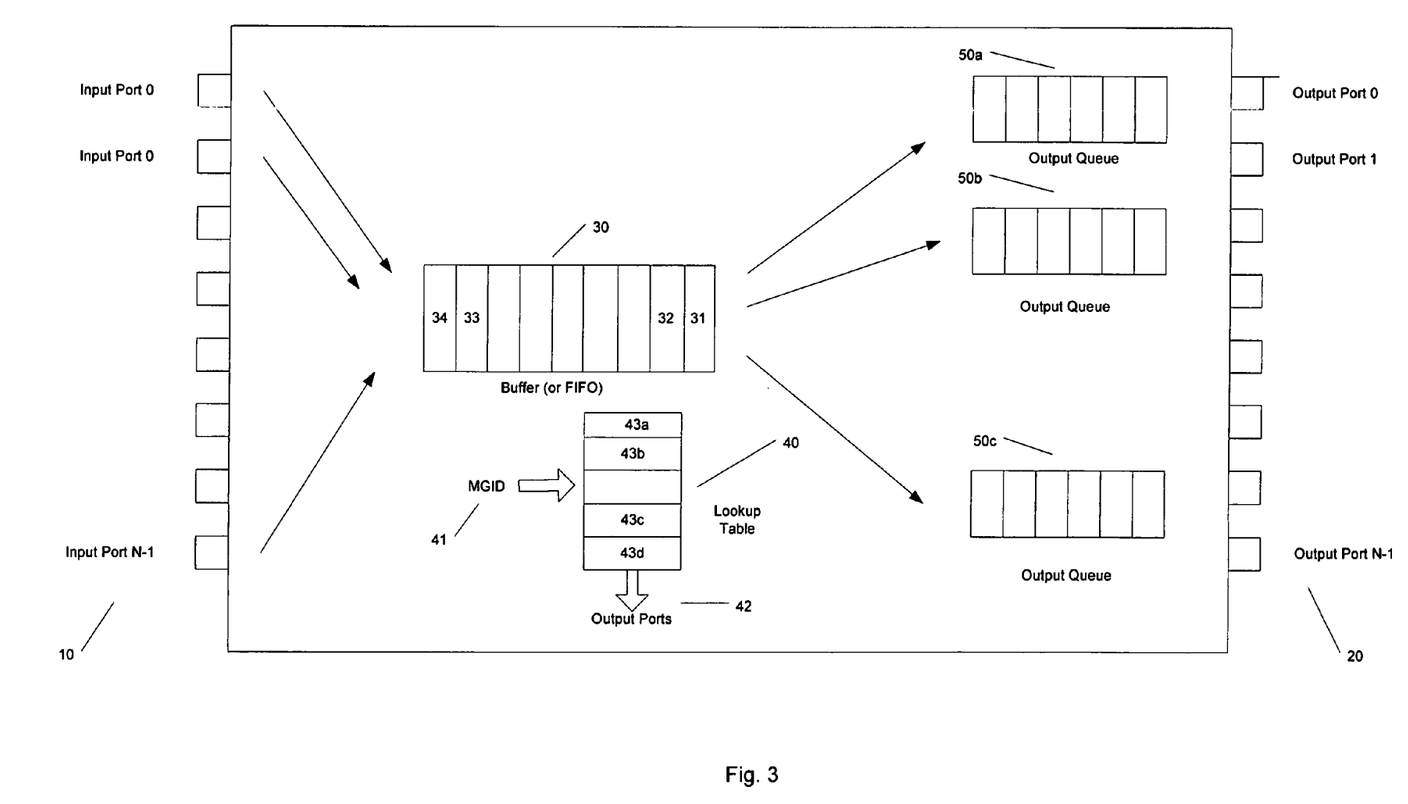
FIG. 3 illustrates a first embodiment of the multicast architecture of the present invention.

FIG. 3 illustrates a first embodiment of the multicast architecture used within a network switching device. As is customary, the switching device has a set of input ports 10 and a set of output ports 20. The number of input ports and output ports in the device is dependent on the specific application, and the present invention does not limit this number. In most embodiments, like that shown in FIG. 3, the number of input ports and the number of output ports are the same, although the invention is not limited to only this configuration. Data is sent to the switching device from a number of nodes. This data arrives at the input ports 10. In most embodiments, each input port is in communication with a single node, and each output port is in communication with a single node. The data is sent preferably in the form of packets, which are defined, formatted blocks of information. Typically, these packets will include information about the packet, such as the type of packet, the size of the packet, its original source, its final destination, and the path through which it is to be routed. This list is illustrative only and is not meant to constrain the invention. One specific type of packet is referred to as a multicast packet, which as described above is a packet sent from a single source to multiple destinations simultaneously. Typically, multicast packets contain within them a multicast group identifier (MGID). This MGID is used to identify the set of output ports via which the multicast packet will be transmitted. Different network protocols allow varying numbers of MGIDs. Often times, the actual devices used to implement the network can further limit this number, due to their limited storage capabilities. As described above, current switching device implementations can require prohibitive amounts of storage to implement large numbers of MGIDs.

Returning to FIG. 3, the multicast packets from all of the input ports 10 are stored in one or more storage elements (not shown). There are a number of queuing schemes that can be implemented. For example, in input port based queuing, a storage element is associated with each input port and all packets arriving via that input port are stored in that queue. Alternatively, in centralized queuing, all of the input ports supply packets to a central storage element. The present invention does not limit the design to either of these, or any other queuing implementation. In the preferred embodiment, packets are stored in queues associated with their respective input port. After receipt, a pointer associated with the recently received packet is then stored in storage element 30. Preferably, the storage element 30 operates as a FIFO, where the first pointer stored in the element will be the first pointer retrieved from the element. In most networks, each switch communicates to each of its neighboring switches a number of multicast packets that it can store. This number is commonly referred to as the number of credits. Assume that the number of credits is uniform for each input port and is represented by M. Thus, storage element 30 must be able to hold N*M multicast pointers. This determines the size of storage element 30. A similar calculation is used to determine the required bandwidth of storage element 30. Assume that each input port simultaneously receives a multicast packet. The storage element 30 must be able to accept all of these pointers without discarding any. Thus, the minimum bandwidth required can be expressed as:

N×the packet arrival rate, where the packet arrival rate is the speed at which packets are sent between devices.

This guarantees that the storage element 30 is able to store pointers associated with multicast packets arriving simultaneously from all ports.

As described above, the storage element 30 preferably operates as a FIFO, servicing the multicast pointer that has been resident in the element for the longest duration first. When a pointer reaches the head of the FIFO, represented by slot 31, it is processed by logic in the device. This logic (not shown) uses the pointer value to identify the location of the multicast packet. It then parses the multicast packet to determine the MGID which it is associated with. That MGID 41 is then used as an index to determine the destination output ports 42 associated with that MGID. In the preferred embodiment, a storage element 40 is used to perform this function. The MGID 41 is used as an index into a table of values 43. Each value within the table corresponds to the destination output ports associated with that MGID. The representation of those values can vary, but preferably consists of a bit map, wherein each bit in the bit map corresponds to an output port of the device. For example, in an 8 port switch, MGID 4 may return a value of 10011101, when used as an index into the table. Assuming that the bit position corresponds to the output port number, this value indicates that the packet is destined for output ports 0, 2, 3, 4, and 7. Similarly, a value of 11111111 would indicate that the packet is to be transmitted via all output ports.

This table of values 43 can be created in a variety of ways. In one embodiment, software within the device writes the specific MGID values into the table, based on upper layer communication protocols. In a second embodiment, unicast "join" or "remove" packets are sent between the source and the destination and the hardware within the device interprets these packets and modifies the tables. Other methods of creating this table are known in the art, and this invention is not limited to any particular implementation.

Associated with each output port is a corresponding output queue 50. These output queues operate as a FIFO, where the first item that is received is the first item that is processed. Once the destination output ports for the packet at the head of the FIFO 30 are determined, the output queues 50 associated with these destination output ports 42 are modified. In the preferred embodiment, a pointer, representing the location of the multicast packet, is stored in each output queue associated with a destination output port. Alternatively, the entire multicast packet can be stored in each of the output queues, however, this consumes significant storage area. Having stored the pointer of the multicast packet in each of the associated output port queues, the pointer can then be removed from the FIFO 30.

In the preferred embodiment, the output queues 50 are each able to hold N×M pointer values. In this manner, there is no head of line blocking caused by the FIFO 30, since all of the entries in the FIFO can be moved to the output queues, since the output queues can hold as many pointers as were stored in the FIFO 30.

Alternatively, the output queues 50 can be smaller. However, smaller output queues can lead to head of line blocking in the FIFO. Suppose that the FIFO can hold 100 pointers, while each output queue is only capable of holding 10 pointers. Once an output queue has stored its tenth pointer, it is unable to accept any new pointers until it has transmitted at least one packet. Thus, once the pointer for the eleventh packet destined for that output port reaches the head of the FIFO 30, it must remain there until the output queue has sufficient space to store it. Since storage element 30 is a FIFO, all subsequent pointers are forced to remain in the FIFO until the pointer at the head of the FIFO has been successfully moved to the output queues.

Returning to FIG. 3, once a pointer is stored in an output queue 50, it is removed from the FIFO 30. The multicast packet is then ready to be transmitted via the associated output port. Since these output queues are used only to store multicast packets, these packets must be merged with other unicast packets before being transmitted. Scheduling algorithms used to merge multicast and unicast packets prior to transmission are known to those skilled in the art, and the selection of a scheduling algorithm represents a design specific decision. The choice of scheduling algorithm is not limited by the present invention and any such algorithm can be used. For example, assigning multicast packets to a low priority as compared to unicast packets will improve the unicast performance of the device. However, overall network design consideration may suggest that poor multicast performance is unacceptable. Additionally, quality of service (QoS) requirements may be another constraint. The selection of a scheduling algorithm represents a balance between these considerations.

The pointer remains in the output queue 50 until the multicast packet has been transmitted via the associated destination port. Once this occurs, the output queue then selects the next pointer in the queue and prepares that multicast packet for transmission. Since the output queue 50 operates as a FIFO, the order in which the multicast packets are transmitted matches the order in which they were received. In the preferred embodiment, when the output queue wishes to send a packet, the logic indexes into the input queue using the pointer that is stored in the output queue 50. It then reads the packet out of the input queue starting at the address of the pointer.

As described earlier, the FIFO 30 must have sufficient bandwidth (N×packet arrival rate) to receive pointers for multicast packets from all input ports simultaneously. In the preferred embodiment, the bandwidth of the FIFO 30 is greater than this value so as to allow pointers to be read from the FIFO 30 while pointers are being written into it. Any value greater than N×packet arrival rate guarantees that there is some bandwidth available to read pointers from the FIFO 30. A bandwidth of 2×N×packet arrival rate guarantees that pointers can be written into the FIFO 30 by all input ports, while pointers are being read from the FIFO by all output ports.

Figure 4:
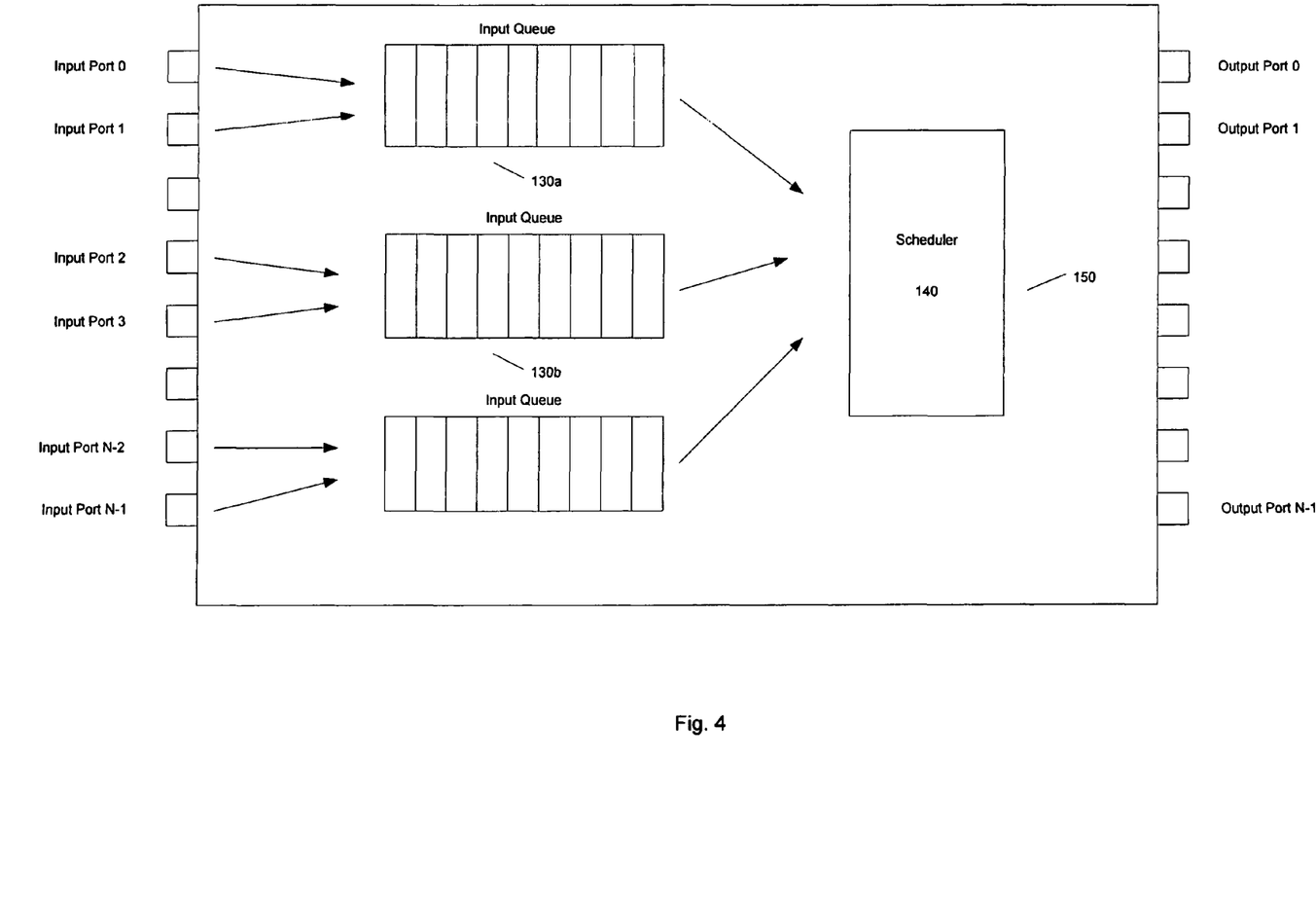
FIG. 4 illustrates a second embodiment of the input FIFO of the present invention.

Depending on the number of ports in the device, a storage element of sufficient bandwidth to support all of the input ports simultaneously writing pointers may be impractical, or prohibitively expensive. FIG. 4 shows a second embodiment of the FIFO 30 of FIG. 3. In this embodiment, several storage elements replace the single FIFO 30 shown in FIG. 3. Preferably, each of these storage elements is dedicated to a subset of the input ports. In FIG. 4, FIFO 130a receives pointers from input ports 0 and 1; while FIFO 130b receives pointers from input ports 2 and 3. In this way, the minimum bandwidth requirement of each FIFO 130 is reduced significantly from that of the FIFO 30 in FIG. 3. In this embodiment, each FIFO 130 must have bandwidth in excess of 2×packet arrival rate. This value is a function of the number of input ports which utilize the particular FIFO, and can be varied by changing the distribution of input ports to FIFO elements.

Since the received packets are no longer in a single location, a scheduler 140 is used to select which of the pointers at the head of the various FIFOs 130 is the head of the combined FIFO 150. In the preferred embodiment, a single round robin scheduler can be used, although the invention is not limited to any specific scheduler. The pointer which is determined to be the head of the combined FIFO is then used to locate the associated multicast packet. This packet is then parsed to determine its MGID. This value is then used as an index into a table as shown in FIG. 3. The rest of the architecture is identical to that shown in FIG. 3 and is therefore not repeated in FIG. 4.

Returning to FIG. 3, once a multicast packet has been transmitted via the destination output ports as determined by the lookup table 40, the multicast pointer is discarded from the corresponding output queue 50. Once the packet has been transmitted via all of the destination output queues, the input queue that held the packet can be rewritten with a new packet. Thus, the device is able to accept a new incoming multicast packet. The switching device generates a message to the node that sent the multicast message that has just been transmitted. This message notifies the sender that it is able to send an additional multicast packet, since the device has the necessary space to store the packet. This message effectively returns a credit to the sender, allowing it to send another packet.

In this embodiment, there is never any head of line blocking in the FIFO 30, since there is an equal amount of space in each output queue 50. Alternatively, the output queues 50 can be implemented with less storage than the FIFO as explained earlier, although this can yield head of line blocking issues.

Figure 5:
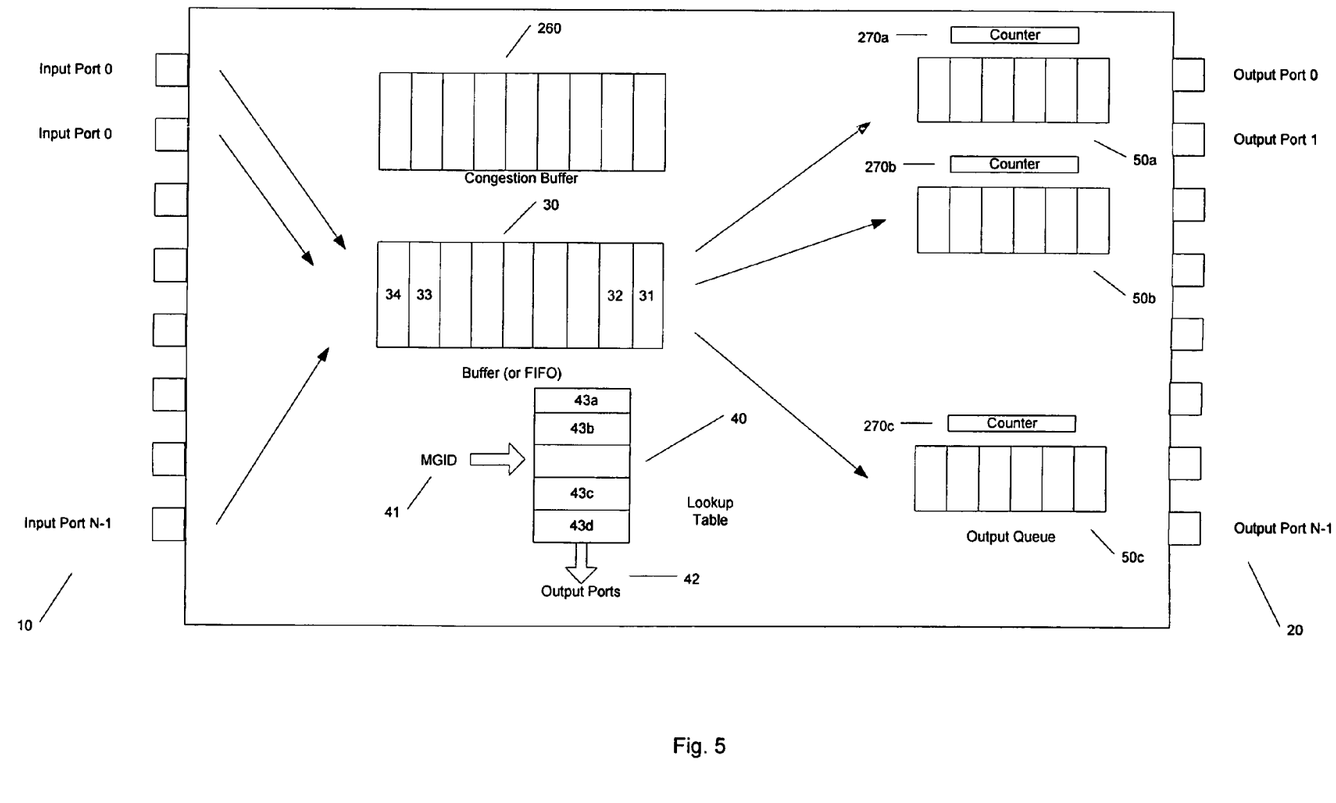
FIG. 5 illustrates a first embodiment of the multicast architecture of the present invention, using a congestion FIFO.

FIG. 5 illustrates a second embodiment of the multicast architecture of the present invention, in which the output queues 50 contain less storage than the FIFO 30. As described above, head of line blocking is possible when the output queues 50 contain less storage than the FIFO 30. FIG. 5 uses a congestion FIFO 260 to relieve the head of line blocking issue. Preferably, the congestion FIFO 260 can store the same number of pointers as the FIFO 30, although the minimum requirement is that it must store the number of pointers in the FIFO 30 less the number of pointers that can be stored in any one of the output queues 50.

Packets are received and stored in a similar manner as with the embodiment illustrated in FIG. 3. Pointers for each multicast packet are stored in FIFO 30. When a pointer reaches the head of the queue, it is used to locate the associated packet. That packet is then parsed to determine its MGID, which is used as an index into a table of values 40.

Having determined the destination output ports 42 for this packet, the control logic must ensure that each output queue 50 has sufficient space to store this pointer. In one embodiment, each output queue 50 has a counter register 270 associated with it. This register signifies the number of entries associated with this queue that are in the congestion queue 260. Thus, after determining the appropriate destination output ports, the control logic examines the counter register 270 associated with each destination output queue 50. If that counter register contains a value of zero, then there are no pointers in the congestion queue associated with this output queue. Therefore, the pointer can be placed in this output queue 50, if there is space remaining. If the output queue is full, or the value of counter register 270 is non-zero, then the control logic cannot place the pointer in the output queue and creates an entry for the congestion queue 260. The control logic then increments the value of counter register 270 by one, signifying that there is an additional pointer in the congestion queue 260 associated with this output port. This process is repeated for all of the destination output ports associated with the MGID of the current packet. Once this process has been completed, the control logic stores the pointer in the congestion queue 260, if necessary. In addition to the pointer, it also stores the output queues that were unable to store the pointer as determined above. For example, a pointer may be associated with a packet with an MGID indicating that it is to be sent via output ports 1, 2, 3 and 4. If output queues 3 and 4 are full, then the pointer will be written into the output queues 1 and 2, as previously described. The pointer will then be written into the congestion queue 260, with an indication that it is to be sent only via output ports 3 and 4, since output queues 1 and 2 have stored the pointer already. In addition, the control logic increments the value in the counter register 270 associated with output queues 3 and 4. This allows all of the multicast pointers stored in the FIFO 30 to either be placed on the appropriate output queues 50, or placed on the congestion queue 260, thereby eliminating the head of line blocking problem with respect to the FIFO 30.

Scheduling logic (not shown) reintroduces pointers from the congestion queue 260 back to the output queues. The scheduling logic monitors the output queues indicated by the entry at the head of the congestion FIFO. When one of the output queue associated with the pointer at the head of the congestion FIFO 260 is no longer full, the scheduling logic copies the pointer from the congestion FIFO to the output queue 50. Since a pointer has been removed from the congestion FIFO 260, the counter register 270 associated with that output queue is decremented by one. If that pointer has been copied to all of the output queues associated with it, then the pointer is removed for the congestion FIFO 260, and the next pointer becomes the new head of the congestion FIFO.

This embodiment eliminates the head of line blocking with respect to the FIFO 30, however it introduces head of line blocking in the congestion FIFO 260 in the event that more than one output queue is congested. For example, suppose that output queues 1 and 2 are both full. Any packet destined for these ports has its pointer placed in the congestion FIFO. If only one of the two output ports later becomes uncongested, pointers can be moved off the head of the congestion FIFO as long as they are destined for the newly uncongested port. Once a pointer reaches the head of the congestion FIFO that is destined for the still congested output port, the congestion FIFO is stalled.

In terms of storage space, this embodiment consumes less space than that of FIG. 3. Assume that the space of the FIFO in both embodiments is represent by S. Also assume that in the embodiment of FIG. 5, the output queues are S/2 and the congestion FIFO is S. Also assume that the device in both embodiments has 8 output ports. In the embodiment of FIG. 3, the total space is given by:

$$S+8 \times S = 9 \times S,$$

since the output queues are the same size as the FIFO. In the embodiment of FIG. 5, the total space is given by:

$$S+S+8 \times S/2 = 6 \times S.$$

Thus, the introduction of the congestion FIFO using these parameters reduces the storage requirement by 25%. However, it introduces head of line blocking in the scenario where there are more than one congested output port. By varying the relative sizes of the congestion FIFO and the output queues, the storage requirements and probability of head of line blocking can be varied.

Figure 6:
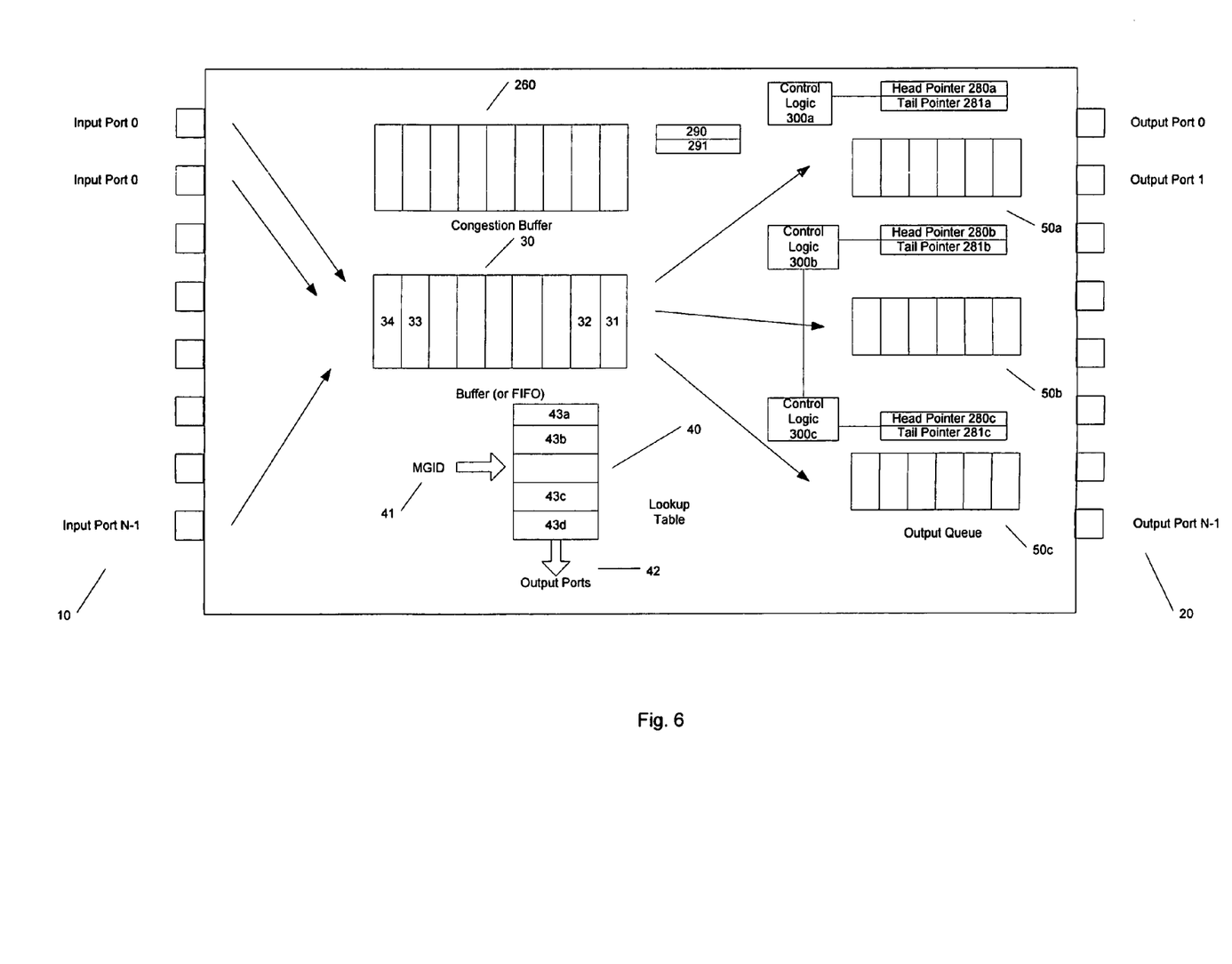
FIG. 6 illustrates a second embodiment of the multicast architecture of the present invention, using a congestion FIFO.

A second embodiment, shown in FIG. 6, eliminates the head of line blocking issue associated with the congestion FIFO illustrated in FIG. 5. In this embodiment, all of the output queues 50 have an associated head pointer 280 and tail pointer 281. Similarly, the congestion FIFO 260 has a head pointer 290 and a tail pointer 291. As entries reach the head of FIFO 30, the appropriate output queues are determined based on the multicast group identifier, as explained above. The control logic (not shown) then checks the head pointer 280 and tail pointer 281 associated with each required output queue 50. If the values contained in the head and tail pointers indicate that the congestion FIFO 260 does not contain any entries associated with this output queue (e.g. the pointers are equal), the control logic stores the entry in the output queue 50, if there is sufficient space. Otherwise, the control logic moves the entry into the congestion FIFO 260 and identifies, within the entry, all of the output queues that are associated with this entry. It also updates the tail pointer 281 of the output queues 50 with a value indicative of the location of the newly inserted entry. The tail pointer 291 of the congestion FIFO 260 is also updated with this new value. As each entry reaches the head of the FIFO 30, this process is repeated.

Items are removed from the congestion FIFO 260 when the output port transmits a packet. When a packet is transmitted, this action frees up space in the respective output queue(s) 50. The control logic associated with that output queue 300 then attempts to replenish that freed space with an entry from the congestion FIFO 260. This control logic 300 first determines whether there are any entries in the congestion FIFO 260 destined for this output port based on the values of the head pointer 280 and the tail pointer 281. If the head and tail pointers indicate that there are no entries in the congestion FIFO 260 for this output queue, then the control logic 300 simply waits until the next packet arrives from the FIFO 30. However, if there is at least one entry in the congestion FIFO 260, the control logic 300 will begin scanning the congestion FIFO, starting at the address indicated in the head pointer 280. Since the congestion FIFO 260 contains entries destined for all output queues, the control logic 300 must determine whether this entry is indeed intended for its output queue. If it is not, the head pointer 280 is incremented and the process is repeated until either an entry destined for this output queue is found or the head pointer matches the tail pointer (indicating that the FIFO has been exhausted).

Once an entry has been identified that is destined for this output queue 50, the control logic 300 copies the entry into the output queue, and modifies the entry in the congestion FIFO 260 to remove the reference to this output queue.

Finally, once the entry at the head of the congestion FIFO 260 has been copied to all of the output queues 50 that are specified in the entry, it is removed from the congestion FIFO 260, and the head pointer 290 of the congestion FIFO is updated accordingly. When the head pointer 290 is incremented, the control logic (not shown) verifies that the new entry at the head of the congestion FIFO has not already been processed by all of the specified output queues. If it has, the control logic increments the head pointer again and checks the new entry at the head of the FIFO. This process repeats until the entry at the head of the congestion FIFO 260 has not been processed by all of the specified output queues, or the head pointer 290 matches the tail pointer 291.

For example, assume that there are three congested output queues; output ports 0,1 and 2. Further assume that entries in the congestion FIFO are destined for the following output ports:

P0 (at head of congestion queue)→0,1
P1→1,2
P2→0,2
P3→1,2
P4→0,1

Based on this configuration of entries in the congestion FIFO, the head pointer 280a of output port 0 points to P0 and the tail pointer 281a points to P4. The head pointer 280b of output port 1 also points to P0 and the tail pointer 281b also points to P4. Lastly, the head pointer 280c of output port 2 points to P1 and the tail pointer 281c points to P3.

When output port 1 transmits a packet, the control logic 300b checks the entry pointed at by the head pointer 280b and finds that packet P0 is destined for this port. The pointer is then copied to output queue 50b, and the entry in the congestion FIFO 260 is modified to reflect that output port 1 has processed this entry. The head pointer 280b is then incremented to point to P1. The entries in the congestion FIFO are as follows:

P0 (at head of congestion queue)→0
P1→1,2
P2→0,2
P3→1,2
P4→0,1

Later, output port 2 transmits a packet and repeats the process described above. The result is that the pointer for P1 is moved into the output queue 50c, the head pointer is incremented to point to P2 and the entries in the congestion FIFO are as follows:

P0 (at head of congestion queue)→0
P1→1
P2→0,2
P3→1,2
P4→0,1

Later, output port 1 transmits a packet and repeats the process described above. The result is that the pointer for P1 is moved into the output queue 50b, the head pointer is incremented to point to P2 and the entries in the congestion FIFO are as follows:

P0 (at head of congestion queue)→0
P1→(none)
P2→0,2
P3→1,2
P4→0,1

Later, output port 1 transmits another packet. The control logic 300b checks the entry (P2) pointed at by head pointer 280b and finds that it is not destined for output port 1. It increments the head pointer 280b and repeats the process. The result is that P3 is moved into output queue 50b and head pointer 280b points to P4. The entries in the congestion FIFO are as follows:

P0 (at head of congestion queue)→0
P1→(none)
P2→0,2
P3→2
P4→0,1

Later, output port 2 transmits 2 packets, and repeats the process described above. In this case, P2 and P3 are copied into output queue 50c. Also, after the completion of these operations, the head pointer 280c cannot be incremented again, since it is pointing to the same entry as the tail pointer 281c, indicating that there are no additional entries in the congestion FIFO 260 destined for output port 2. The next packet that reaches the head of the FIFO 30 destined for output queue 50c can be moved directly to that queue without being placed on the congestion FIFO 260. The current entries in the congestion FIFO appear as follows:

P0 (at head of congestion queue)→0
P1→(none)
P2→0
P3→(none)
P4→0,1

Now, output port 0 transmits a packet. Repeating the process described above, it copies the pointer for P0 into output queue 50*a*. Since P0 was the head of the congestion FIFO and all output queues have now processed it, the head pointer 290 of the congestion FIFO can be incremented to point to P1. However, since P1 was previously processed by output queues 50*b* and 50*c*, the head pointer is incremented again to point to P2. These two locations in the congestion FIFO are now free and can be replaced with new entries. Note that the entry for P3 is also empty, however, since it has not yet reached the head of the congestion FIFO 260, it cannot be released. Thus, the entries in the congestion FIFO 260 appear as follows:

P2 (at head of congestion queue)→0
P3→(none)
P4→0,1

The process described above is repeated while there are entries contained in the congestion FIFO.

While two embodiments illustrating the use of congestion storage elements are shown, the invention is not limited to only these two implementations. Those skilled in the art should understand that there are a number of embodiments that can be implemented employing a congestion storage element to eliminate head of line blocking, while minimizing the storage requirements.

What is claimed:

1. A device, comprising:
   an input buffer configured to store a set of input entries for multicast packets to be transmitted via ones of a plurality of output ports of the device;
   a congestion buffer configured to store a set of congestion entries for multicast packets to be transmitted by the device via congestion affected ones of the plurality of output ports; and
   a plurality of output buffers including first, second, and third output buffers, wherein the first, second, and third output buffers are respectively configured to store a set of output entries for packets to be transmitted via first, second, and third ones of the plurality of output ports;
   wherein the input buffer is configured to store an input entry for a first multicast packet to be transmitted via at least the first, second, and third output ports;
   wherein the device is configured, in response to the first output port not being congestion affected but the second and third output ports being congestion affected, to cause:
      removal of the input entry for the first multicast packet from the input buffer;
      storage of an output entry for the first multicast packet in the first output buffer; and
      storage of a congestion entry for the first multicast packet in the congestion buffer, wherein the congestion entry includes a pointer to data of the first multicast packet, and wherein the congestion entry further includes destination information indicating that the first multicast packet is yet to be transmitted via the second and third output ports; and
   wherein the device is configured to modify the destination information in the congestion entry based, at least in part, on a subsequent indication that at least one of the second and third output ports is not currently congestion affected.

2. The device of claim 1, wherein the device is configured to determine the destination output ports for a particular multicast packet by accessing a bit map using a multicast group identifier for the particular multicast packet; and wherein each bit of the bit map corresponds to a respective one of the plurality of output ports.

3. The device of claim 1, wherein the device is further configured to transmit a notification message to a node coupled to the device after the first multicast packet has been transmitted at all of the destination output ports for the first multicast packet;
   wherein the notification message indicates that the device is able to receive an additional multicast packet.

4. The device of claim 1, wherein the set of input entries, the set of congestion entries, and sets of one or more entries in the first, second, and third output buffers are configured to include a reference to a memory location configured to hold contents of a multicast packet; and
   wherein the second and third output ports being congestion affected includes the second and third output buffers being too full to accommodate a new entry for a multicast packet.

5. The device of claim 1, further comprising an additional input buffer configured to store entries for multicast packets to be transmitted by the device;
   wherein the first input buffer is configured to store one or more entries for one or more multicast packets upon the one or more multicast packets arriving at the device via a first set of input ports; and
   wherein the additional input buffer is configured to store one or more entries for one or more other multicast packets upon the one or more other multicast packets arriving at the device via a second set of input ports.

6. The device of claim 1, wherein the device is configured to remove the output entry from the first output buffer based, at least in part, on the device transmitting the first multicast packet via the first output port.

7. The device of claim 1, wherein the plurality of output buffers includes dedicated output buffers for individual ones of the plurality of output ports.

8. A method, comprising:
   a device storing an input entry corresponding to a first multicast packet, wherein said storing is in an input buffer of the device, wherein the device has a plurality of output ports, wherein the input buffer is configured to store a set of entries corresponding to a plurality of multicast packets to be transmitted by the device, and wherein the first multicast packet is to be transmitted via at least first, second, and third ones of the plurality of output ports;
   in response to an indication that the first output port is not congestion affected but the second and third output ports are congestion affected, the device:
      storing an output entry corresponding to the first multicast packet in a first output buffer;
      storing a congestion entry corresponding to the first multicast packet in a congestion buffer of the device, wherein the congestion entry includes a pointer to data of the first multicast packet, and wherein the congestion entry further includes destination information indicating that the first multicast packet is yet to be transmitted via the second and third output ports; and
      removing the input entry corresponding to the first multicast packet from the input buffer; and
   the device, in response to a subsequent indication that at least one of the second and third output ports is not congestion affected:
      storing an entry corresponding to the first multicast packet in at least one of a second output buffer and a third output buffer of the device; and modifying the destination information in the congestion entry;

wherein the congestion buffer is configured to store a set of congestion entries corresponding to multicast packets to be transmitted via congestion affected ones of the plurality of output ports.

9. The method of claim 8, further comprising:

the device removing the congestion entry from the congestion buffer based on one or more indications that both the second and third output ports are not congestion affected; and the device transmitting the first multicast packet via the first, second, and third output ports.

10. The method of claim 8, further comprising:

after the first multicast packet has been transmitted via all of a number of the plurality of output ports at which the device determines the first multicast packet is to be transmitted, the device transmitting a notification message to a node coupled to the device, wherein the notification message indicates that the device is able to receive an additional multicast packet.

11. The method of claim 8, further comprising:

in response to transmitting the first multicast packet via all of a number of the plurality of output ports at which the device determines the first multicast packet is to be transmitted, freeing a memory location in the device, wherein the memory location is indicated by the pointer and configured to store the data of the first multicast packet.

12. The method of claim 8, wherein the indication that the second and third output ports are congestion affected is based, at least in part, on one or more entries for multicast packets being stored in the second output buffer and one or more entries for multicast packets being stored in the third output buffer.

13. The method of claim 8, wherein modifying the destination information in the congestion entry includes removing information indicating the first multicast packet is to be transmitted via the second output port but not removing information indicating the first multicast packet is to be transmitted via a third one of the plurality of output ports.

14. An apparatus, comprising:

first means for storing a plurality of multicast input entries for a plurality of multicast packets to be transmitted via a plurality of output ports;

second means for storing multicast congestion entries for multicast packets to be transmitted via congestion affected ones of the plurality of output ports and third means for storing one or more transmission entries for one or more of the plurality of multicast packets to be transmitted, wherein individual ones of the one or more transmission entries correspond to a transmission of a multicast packet via a single one of the plurality of output ports;

wherein, for a given multicast packet to be transmitted via first, second, and third ones of the plurality of output ports, the apparatus is configured to store a first multicast input entry corresponding to the given multicast packet in the plurality of multicast input entries in the first means;

wherein the apparatus is configured, in response to congestion affecting the second and third output ports but not the first output port, to cause:

removal of the first multicast input entry for the given multicast packet from the first means;

storage of a first multicast congestion entry in the second means, wherein the first multicast congestion entry indicates the given multicast packet is to be transmitted via the second and third output ports, and wherein the first multicast congestion entry includes a reference to a memory location configured to store data of the given multicast packet; and storage of a first transmission entry in the third means, wherein the first transmission entry indicates the given multicast packet is to be transmitted via the first output port; and wherein the apparatus is configured, based at least in part on a subsequent indication that congestion is no longer affecting at least one of the second and third output ports, to cause modification of the first multicast congestion entry.

15. The apparatus of claim 14, further comprising:

fourth means for scheduling transmission of multicast packets for which entries are stored in the second means.

16. The apparatus of claim 14, wherein the modification of the first multicast congestion entry includes removing the first multicast congestion entry from the second means.

* * * * *

UNITED STATES PATENT AND TRADEMARK OFFICE
CERTIFICATE OF CORRECTION

| | | |
|---|---|---|
| PATENT NO. | : 7,916,743 B2 | Page 1 of 1 |
| APPLICATION NO. | : 10/990585 | |
| DATED | : March 29, 2011 | |
| INVENTOR(S) | : Dohm | |

It is certified that error appears in the above-identified patent and that said Letters Patent is hereby corrected as shown below:

Column 14, line 3, in Claim 14, delete "ports and" and insert -- ports; and --.

Column 14, line 32, in Claim 14, delete "part" and insert -- part, --.

Signed and Sealed this
Ninth Day of August, 2011

David J. Kappos
*Director of the United States Patent and Trademark Office*